Jan. 29, 1957 P. S. MAIWURM 2,779,613
THREADED CABLE FITTING
Filed March 30, 1954
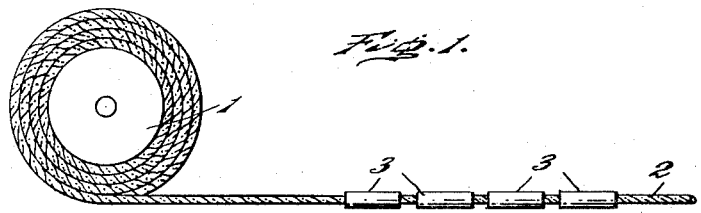
Fig.1.
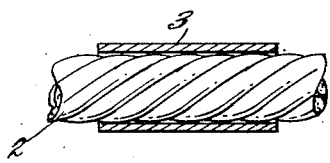  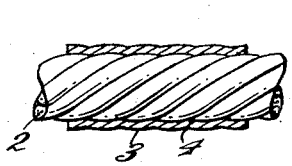 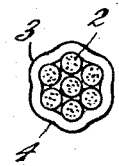
Fig.2. Fig.3. Fig.4. Fig.5.
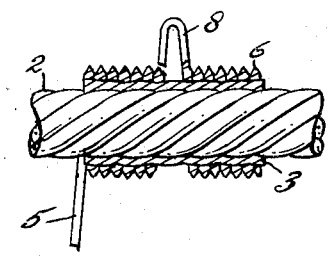  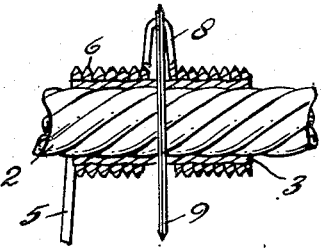
Fig.6. Fig.7. Fig.8.
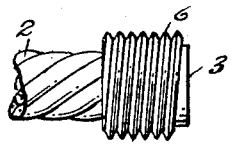 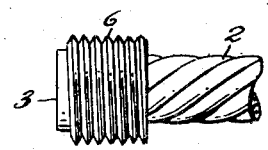 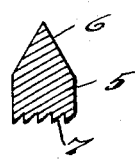
Fig.9. Fig.10. Fig.11.
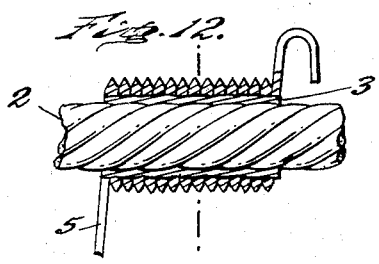
Fig.12.
INVENTOR
Paul S. Maiwurm
BY
Herbert S. Fairbanks
ATTORNEY

United States Patent Office 2,779,613
Patented Jan. 29, 1957

2,779,613
THREADED CABLE FITTING
Paul S. Maiwurm, Pennsburg, Pa.

Application March 30, 1954, Serial No. 419,774

4 Claims. (Cl. 287—75)

The object of this invention is to devise a novel method of making stress fittings for cables and rods and novel stress fittings resulting from such method.

The invention is particularly adapted for line production from a roll or coil of cable, rod or wire.

In carrying out in practice the invention, a desired length of cable is withdrawn from its roll and a number of ferrules or sleeves, preferably of ductile material, are slipped on to the cable. A selected ferrule is compressed on the cable hydraulically, explosively or mechanically to cause the ferrule to bind in the crevices between twists of the cable. A wire is wound around the fitting, first in one direction and then in the opposite direction, placed under tension and heated with the tension maintained, and allowed to cool with the tension maintained. The wire is next annealed and the wound wire, ferrule and cable cut and the ends of the sections ground off. The wound wire thus provides a thread for a clamping nut.

With the foregoing and other objects in view as will hereinafter clearly appear, my invention comprehends a novel method of making stress fittings and the stress fitting resulting from such method.

For the purpose of illustrating the invention, I have shown in the accompanying drawings a preferred embodiment of it which I have found in practice to give satisfactory and reliable results. It is, however, to be understood that the various steps of the method and instrumentalities employed are not limited except by the scope of the appended claims to the exact arrangement and organization of these steps and instrumentalities as herein disclosed.

Figure 1 is a side elevation of a cable roll with a length thereof withdrawn and provided with ferrules.

Figure 2 is a side elevation of a cable portion with a ferrule in position.

Figure 3 is an end elevation of Figure 2.

Figure 4 is a side elevation with the ferrule in section and compressed on the cable.

Figure 5 is an end elevation of Figure 4.

Figure 6 is a side view of the cable with a ferrule in section and with a wire wound around the ferrule.

Figure 7 is an end elevation of Figure 6.

Figure 8 is a view similar to Figure 6 but illustrating the cutting action.

Figure 9 is a side elevation of one of the finished stress fittings.

Figure 10 is a side view of the other finished stress fitting.

Figure 11 is a cross section of the wire employed for forming the fitting.

Figure 12 is a modified form showing the ferrule and wire in section with the wire wound in one direction only.

Similar numerals of reference indicate corresponding parts.

Referring to the drawings:

As shown in Figure 1, a roll 1 supported in any desired manner has had a desired length of cable 2 withdrawn and ferrules 3 slipped on to it.

A selected ferrule is compressed around the cable in any desired manner and into the crevices between the twists of the cable as shown at 4 in Figures 4 and 5.

A wire 5, shown in cross section in Figure 11, is wound around the ferrule, the outer portion of the wire being provided with a standard thread angle 6 and its inner portion with a thread 7. The cable is held stationary during this operation and the wire is wound first in one direction and then in the opposite direction around the ferrule with the threads binding into the cable ferrule and with a loop 8 between the windings.

The wound wire is tensioned and heated while under tension and is then cooled while under tension. The wire is now annealed and a cutter 9 cuts through the wire loop, the ferrule and the cable. The free ends of the cable are ground off. I thus provide two fittings adapted to receive clamping nuts for connection to other members.

The wire may be precoiled as separate units and slipped on the ferrules.

Instead of employing a reverse winding, the wire may be wound or coiled on the ferrules in one direction only or have a slip fit on the ferrules as shown in Figure 12, and the central broken line indicates the cutting point.

The operation of the treatment after winding is the same as that already described in connection with the other figures of the drawings.

Having thus described my invention, what I claim as new and desire to secure by Letters Patent is:

1. A stress fitting for a cable, comprising in combination with a cable, a ferrule compressed on the cable, and a thread forming wire, having a top thread angle and a threaded bottom with the threaded bottom engaging the ferrule, tensioned around the cable.

2. A stress fitting for cables, comprising a cable, a ferrule compressed around the cable and into crevices between the twists of the cable, and a thread forming wire under permanent tension around and indented into the outer face of the ferrule and rigid with it for the reception of a clamping nut.

3. A stress fitting for cables, comprising a cable, a ferrule compressed around the cable and into previces between the twists of the cable, and a thread forming wire having a standard thread angle and tensioned around and indented into the outer face of the ferrule for the reception of a clamping nut.

4. A stress fitting for cables, comprising a cable, a ferrule compressed around the cable and into crevices between the twists of the cable, and a thread forming wire having a standard thread angle and tensioned around and indented into the outer face of the ferrule for the reception of a clamping nut, and the portion of the wire contacting the ferrule being threaded.

References Cited in the file of this patent
UNITED STATES PATENTS

| 244,007 | Wallace | July 5, 1881 |
|---|---|---|
| 833,252 | Schwennker | Oct. 16, 1906 |
| 1,643,150 | Conner | Sept. 20, 1927 |
| 1,812,646 | Burd | June 30, 1931 |
| 1,949,601 | Burd | Mar. 6, 1934 |
| 2,113,674 | Brickman | Apr. 12, 1938 |
| 2,244,696 | Hayden | June 10, 1941 |
| 2,450,519 | Luther | Oct. 5, 1948 |